Aug. 20, 1929. F. B. CROSBY Re. 17,410
ELECTRICALLY OPERATED SWITCH FOR THE PRODUCT OF ROLLING MILLS
Original Filed May 17, 1920
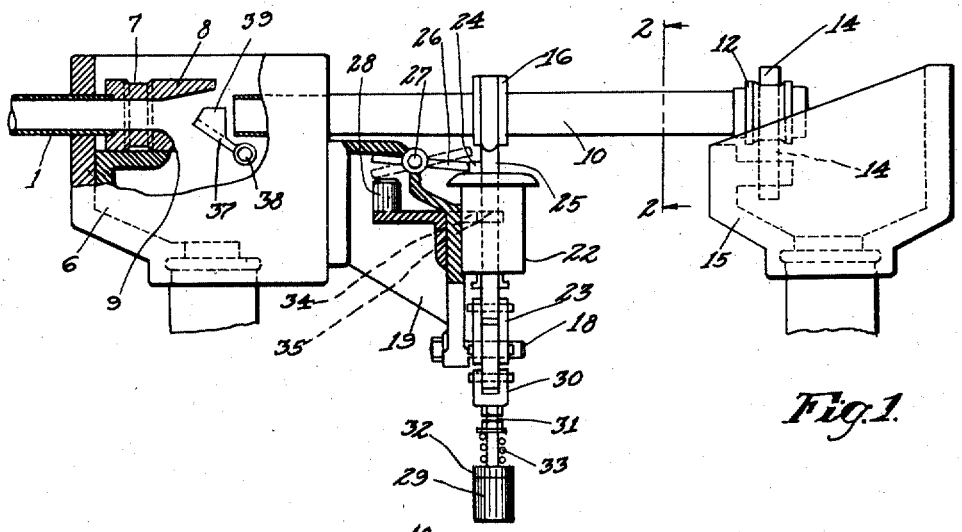
Fig. 1.
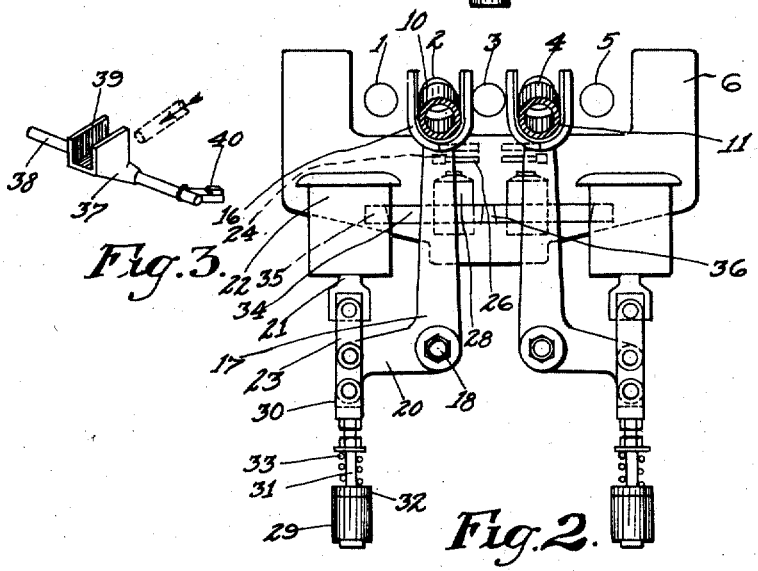
Fig. 3.
Fig. 2.
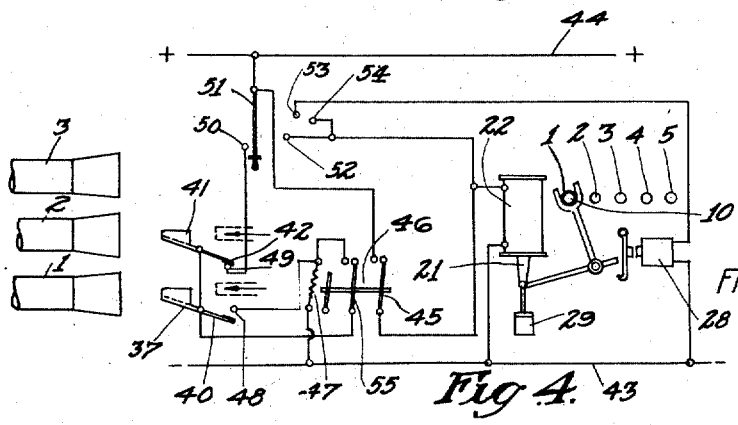
Fig. 4.
Inventor
Fred B. Crosby
By Attorney
Geo. H. Kennedy Reissued Aug. 20, 1929. Re. 17,410

UNITED STATES PATENT OFFICE.

FRED B. CROSBY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

ELECTRICALLY-OPERATED SWITCH FOR THE PRODUCT OF ROLLING MILLS.

Original No. 1,490,965, dated April 22, 1924, Serial No. 382,075, filed May 17, 1920. Application for reissue filed March 30, 1926. Serial No. 98,631.

My invention relates to rolling mills and has for its object to provide an electrically operated switching arrangement for automatically controlling the direction of movement of material coming from such a mill. My improved switching arrangement is particularly adapted for handling relatively long and thin metal strips, such as rods and the like, as the material is delivered by the rolls of the mill, and for purposes of illustration I have shown and described my invention in connection with a rod mill.

In the operation, for instance, of hot rod mills, it is customary to coil the rod on reels immediately after rolling, and it is desirable to be able to direct the rod to any one of several reels, so that a completed coil may be removed from one reel while a new coil is being wound on another reel. Various switching devices have heretofore been employed for automatically directing the rod from one reel to another, following the completion of a coil, but such prior devices have been characterized by the use of relatively complicated fluid actuated mechanism. Furthermore, the operation of such prior switching devices has been limited to the continued alternation of the rod between only a given pair of delivery pipes.

By my invention I propose to provide an electrically operated switching arrangement, by means of which the rolled material may be slectively directed to any one of a number of different deliverey channels or paths in addition to providing for the automatic alternation of the successive pieces of rolled material between any selected pair of channels or paths. These and other advantageous features of my invention will hereinafter more fully appear, reference being had to the accompanying drawings, in which the invention, by way of example, is illustrated in connection with the handling of rods, and in which—

Figure 1 is a view partially in section and partially in side elevation of my switching device.

Figure 2 is a sectional view along the line 2—2, Fig. 1.

Figure 3 is a perspective view of one of the switch arms employed in Fig. 1.

Figure 4 is a diagrammatic view showing the electrical connection of the various switching devices shown in Fig. 1.

Similar reference characters refer to similar parts in the different figures.

Referring to Figs. 1 and 2, the present illustrative embodiment of my invention provides a plurality of stationary delivery pipes, numbered 1 to 5 inclusive, which pipes are supported in a row upon a suitable frame member 6. Each delivery pipe is provided with a head 7 that has a flared portion 8 which is cut away, as shown at 9, for a purpose to be hereinafter described. A pair of switch pipes 10 and 11 are respectively mounted for movement along the row of delivery pipes 1 to 5 inclusive, and as the switch pipes are mounted and controlled in substantially the same manner, only one will be described in detail.

The switch pipe 10 is provided at one end with a collar 12 supported in a socket or ring 13 that is pivotally mounted upon a pin 14 on a frame member 15. The pipe 10 is supported between the frame members 6 and 15 by a yoke 16 provided at the upper end of a bell crank lever 17. The lever 17 is pivotally mounted on a pin 18 carried by an extension 19 of the frame member 6. The short arm 20 of the lever 17 is connected to the end of the plunger 21 of a solenoid 22 by means of a link 23.

When the solenoid 22 is energized, the plunger 21 holds the end of the switch pipe 10 in alinement with the end of the delivery pipe 2. The lever 17 is prevented from further movement about its pivot by means of a stop 24 provided on the long arm 25 of the lever 17, which is then in engagement with the armature 26 of an electromagnet 28. The armature is pivoted at 27 and is so proportioned that its longer arm normally engages the stop 24 in its unbalanced position and with the magnet 28 deenergized. A counterweight 29 is connected to the end of the short arm 20 by means of a link 30 having a spindle 31 upon which the weight 29 is carried. The counterweight is so proportioned that when the solenoid 22 is deenergized, its pull is sufficient to move the arm 20 downwardly and thereby cause the switch pipe 10 to be moved to the left into alinement with the pipe 1. The pull exerted by the counterweight 29 may be varied by the use of additional weights 32 mounted on the spindle 31 and maintained in position by means of a spring 33 surrounding the spindle 31. A bar 34 carried on the extension 19 is provided with stops 35 and 36 which serve to limit the movement of the lever arm 25 about its pivot pin 18, and thereby cause the switch pipe 10 to register with the delivery pipes 1 and 3, respectively.

A trigger 37, pivotally mounted on a shaft 38 is provided with a trough shaped portion 39 that extends below the flared portion 8 on the head 7 of the pipe 1. As best shown in Fig. 3, the trough portion 39 is located in the path of movement of a rod as it emerges from the switch pipe 10, the rod being indicated in dotted lines. The shaft 38 of the trigger 37 extends to a suitable switch box, not shown, and is provided at its end with a contact arm 40. A trigger 41 is mounted in front of the delivery pipe 2 and is provided with a contact arm 42 in the same manner as the trigger 37, as indicated in Fig. 4.

Referring now to Fig. 4, one terminal of the winding of the solenoid 22 is connected to a supply main 43, and the other terminal is connected to a supply main 44 through the movable contact arm 45 of a two-point contactor 46 which is shown in the open position. One terminal of the coil 47 of the contactor 46 is connected to the supply main 43 and the other terminal is connected to a contact member 48 that is adapted to be engaged by the contact arm 40, when the latter is moved upwardly. The contact arm 40 is connected to the contact arm 42 of the trigger 41, and the contact arm 42 is normally in engagement with a stationary contact member 49. The contact member 49 is connected to the stationary contact member 50 of a switch having a movable blade 51, that is connected to the supply main 44. The switch blade 51 is also adapted to be moved into engagement with a contact member 52 connected to the upper terminal of the winding of the solenoid 22, and in a third position the switch blade 51 is adapted to engage a pair of contact members 53 and 54. The contact member 53 is connected to one terminal of the winding of the electromagnet 28, the other terminal of which is connected to the supply main 43. The contact member 54 is also connected to the upper terminal of the winding of the solenoid 22. The switch may be located at any desired point.

Having thus described the various parts entering into my invention, the operation thereof is as follows:—

Assume that the solenoid 22 is deenergized, so that the switch pipe 10 is in alinement with the delivery pipe 1, as indicated in Fig. 4, and that the switch blade 51 has been moved into engagement with the contact member 50. As the rod from the rolls passes from the switch pipe 10 to the delivery pipe 1, it depresses the trigger 37 and moves the contact arm 40 into engagement with the contact member 48, thereby completing the circuit of the coil 47 of the contactor 46. When the contactor 46 closes, the circuit of the winding of the solenoid 22 is completed through the contact arm 45 of the contactor 46. The energization of the solenoid 22 exerts an upward pull on the plunger 21 and thereby tends to move the yoke 16 with the switch pipe 10 to the right, but this movement is prevented as long as the rod continues to pass through the delivery pipe 1. When a coil has been completed upon the reel to which the delivery pipe 1 leads and the rod leaves the switch pipe 10, the yoke 16 then moves to the right under the pull of the solenoid 22. The switch pipe 10 then comes into alinement with the delivery pipe 2, owing to the fact that further movement of the yoke 16 to the right is prevented by engagement of the armature 26 with the stop 24. When the end of the rod leaves the delivery pipe 1, the trigger 37 is free to move upward to its normal position, thus breaking the circuit of the coil 47 at the contact member 48, but the contactor 46 is prevented from opening by a holding circuit provided through the contact arm 55.

When the rod emerges from the switch pipe 10 and enters the delivery pipe 2, the trigger 41 is depressed, thereby breaking the circuit of the coil 47 at the contact member 49. The delivery pipe 10, however, is held in alinement with the pipe 2 as long as the rod continues to pass therethrough, but when a second coil has been completed, and the rod cleared, the switch pipe 10 will be moved back into alinement with the delivery pipe 1. This movement is caused by the counterweight 29 acting on the end of the bell crank lever 17. It is apparent, then, that as long as the switch blade 51 is in engagement with the contact member 50, the switch pipe 10 will deliver the rod first to the pipe 1 and then to the pipe 2, and that this alternation will continue automatically as long as rod is delivered to the switch pipe 10. With this arrangement, no time is lost in beginning the formation of a new coil after one coil has been completed, for it is obvious that the switch pipe 10 is always ready to move to its new position before the coil has been completed.

When it is desired to have the rod pass only through the delivery pipe 1, the switch blade 51 is moved into a position midway between the contact members 50 and 52. The winding of the solenoid 22 then remains deenergized and the switch pipe 10 will be maintained in alinement with the delivery pipe 1 by the counterweight 29 as long as the switch blade 51 remains in this position.

When it is desired to have the strip pass only to the delivery pipe 2, the switch blade 51 is moved into engagement with the contact member 52. In this position, the winding of the solenoid 22 is energized continuously, and the switch pipe will then be held in alinement with the delivery pipe 2 as long as the switch blade 51 remains in this position.

In case it is desired to obtain a sample coil at any time during the operation of the mill, it is only necessary to move the switch blade 51 to engagement with the contact members 53 and 54. In this position the winding of the electromagnet 28 is energized through the contact member 53 and its armature 26 is moved out of engagement with the stop 24 on the lever 17. As the winding of the solenoid 22 is also energized through the contact member 54, the switch pipe 10 is moved to the right against the stop 36 and into alinement with the delivery pipe 3 which leads to the sample reel. As soon as the rod enters the delivery pipe 3, the switch blade 51 may be moved to any one of its other positions, so that the rod will be directed to either one of the delivery pipes 1 or 2 as soon as the sample coil is completed.

The control of all of the operations of my switching arrangement from any desired point is particularly advantageous, for it enables an operator stationed at the reels, or other receiving devices, to selectively control the delivery of the material thereto. Thus, if a cobble should occur during the formation of a coil on one reel, it would be possible for the operator to hold the switch pipe continuously on the other delivery pipe until the first reel had been cleared, or the rod could be diverted temporarily to the sample reel. In this way the mill could be kept running continuously even with one reel, or other receiving device, out of commission for a considerable period. This would not be possible with merely alternation between a given pair of receiving devices, as in the previous switching arrangements.

From the foregoing, it is apparent that I have provided an electrically operated selective switching arrangement for the product of rolling mills that is extremely flexible in its operation. By the use of my invention the strip may be delivered continuously to any one of several delivery channels or paths, or it can be delivered alternately, first to one channel or path and then to another. Obviously my switching arrangement is not restricted to the specific number of delivery channels or paths shown, for the electrical connections are readily capable of such modification as may be necessary to adapt it for use in connection with a larger number of delivery channels or paths. Furthermore it is apparent that my invention may be advantageously employed for automatically controlling the direction of movement of other similar rolling mill product in its passage from the rolls of a mill to a suitable receiving device.

I claim:

1. In a rod mill, the combination with more than two delivery pipes and a movable switch pipe, of electrically operated means for selectively causing the switch pipe to register with any one of said delivery pipes and for automatically causing the switch pipe to alternate between delivery pipes of a selected pair.

2. In a rod mill, the combination with more than two delivery pipes and a movable switch pipe, of electrically operated means for automatically causing the switch pipe to register with first one and then the other of a selected pair of said delivery pipes.

3. In a rod mill, the combination with a plurality of delivery pipes and a movable switch pipe, of electrically operated means comprising circuits controlled by the passage of rods through said switch pipe for causing the switch pipe to register first with one delivery pipe and then with another of a selected pair of delivery pipes.

4. In a rod mill, the combination with more than two delivery pipes and a movable switch pipe, adapted to register with any one of said delivery pipes, of electrically operated means dependent upon the passage of rods through said switch pipe for automatically causing the switch pipe to alternately move between any given pair of delivery pipes.

5. In a rod mill, the combination with more than two delivery pipes and a movable switch pipe in position to deliver rod to one of said delivery pipes, of electrically operated means for causing the switch pipe to be moved into position to deliver rod to any other of said delivery pipes, as soon as the rod ceases to pass to the first named delivery pipe.

6. In a rod mill, the combination with a source of rod supply, a plurality of delivery pipes and a movable switch pipe, of electromagnetic means comprising a movable contact member actuated by movement of a rod passing through the switch pipe for automatically causing the switch pipe to direct the rod from one of said delivery pipes to another.

7. In apparatus for controlling the direction of movement of material from a rolling mill, the combination with a movable switch, of electrically operated means dependent upon the passage of successive pieces of material beyond said switch for automatically causing said switch to alternately direct the pieces of material into different paths, the said alternation continuing as long as material is delivered to said switch.

8. In apparatus for controlling the direction of movement of material from a rolling mill, the combination with a movable switch, of electrically operated means comprising a contact member actuated by passage of successive pieces of material beyond said switch for automatically moving said switch into different positions.

9. In apparatus of the class described, the combination with means for directing moving material from a rolling mill into different paths, of electrically operated means dependent upon the passage of successive pieces of material beyond said direction controlling means for automatically causing the latter to direct the pieces first into one path and then into another.

10. In apparatus of the class described, the combination with means for directing successive pieces of moving material from a rolling mill into different paths, of electrically operated means for selectively causing the direction controlling means to direct the pieces continuously into any one of said paths and for automatically causing the direction controlling means to direct the pieces alternately to a selected pair of paths.

FRED B. CROSBY.